(12) United States Patent
Sperber

(10) Patent No.: US 6,316,510 B1
(45) Date of Patent: Nov. 13, 2001

(54) FOAMABLE BINDER COMPOSITION AND METHODS FOR PRODUCING THE SAME

(76) Inventor: Henry Sperber, 8 Red Fox La., Englewood, CO (US) 80111

( * ) Notice: Subject to any disclaimer, the term of this patent is extended or adjusted under 35 U.S.C. 154(b) by 0 days.

(21) Appl. No.: 09/543,410

(22) Filed: Apr. 5, 2000

Related U.S. Application Data

(60) Provisional application No. 60/128,943, filed on Apr. 13, 1999.

(51) Int. Cl.$^7$ ............................................. C08J 9/00
(52) U.S. Cl. ........................... 521/94; 521/93; 521/134; 521/141; 524/416
(58) Field of Search ................................ 521/82, 93, 94, 521/141, 149; 524/416

(56) References Cited

U.S. PATENT DOCUMENTS 4,148,781 * 4/1979 Narukawa et al. ................ 260/42.51
4,613,627 * 9/1986 Sherman et al. ........................ 521/68

* cited by examiner

*Primary Examiner*—James J. Seidlack
*Assistant Examiner*—Melanie Bagwell
(74) *Attorney, Agent, or Firm*—Sheridan Ross P.C.

(57) ABSTRACT

A foamable binder composition and methods for producing the same are provided. The foamable binder composition of the present invention comprises a corrosion preventing agent, a main adhesion material, a surfactant capable of inducing formation of foams, and water. In addition, a fast wet tack material may also be present. In one application, the foamable binder composition is used with insulating materials in thermally insulating a building.

21 Claims, No Drawings

FOAMABLE BINDER COMPOSITION AND METHODS FOR PRODUCING THE SAME

CROSS-REFERENCE TO RELATED APPLICATIONS

This application claims the benefit of U.S. Provisional Application No. 60/128,943, filed Apr. 13, 1999, which is incorporated herein by reference in its entirety.

FIELD OF THE INVENTION

The present invention is related to a foamable binder composition and methods for producing the same.

BACKGROUND OF THE INVENTION

Methods for supplying fibrous insulating materials by injection under air pressure provide a generally economical method of insulating a desired space. Such methods are economical at least partly because relatively inexpensive fibrous materials such as cellulose, or mineral fibers, fiberglass and the like can be used, as described, for example, in U.S. Pat. Nos. 4,487,365, 4,530,468, and 4,768,710, all of which are issued to Sperber and are incorporated herein by reference in their entirety, and also because of the relative speed with which the insulation can be blown in compared with the installation of batt-type insulation.

In order to avoid or reduce the problem of nonhomogeneous density from such methods, the insulating fibrous material is typically admixed with a binder composition as described in the Sperber patents above. Unfortunately, most binder compositions used in the process of blowing-in fibrous insulation are generally water-based materials, and therefore may cause corrosion of any metals that may be present in the building structure that receives and holds the insulation material. Corrosion of metals in walls, floors, and/or ceilings of a building reduces their strength, and therefore is undesirable. In addition, adhesive property of most binder systems is derived from organic compounds, e.g., polymers. These organic compounds are flammable and create fire hazards.

Therefore, there is a need for a binder system which contains corrosion preventing and fire retardant properties.

SUMMARY OF THE INVENTION

The present invention provides a foamable binder composition and methods for producing the same. In one embodiment of the present invention, the foamable binder composition comprises a corrosion preventing agent, a main adhesion material, a surfactant capable of inducing formation of foams, and water.

Preferably, the corrosion preventing agent also has flame retardant properties to reduce the flammability of the foamable binder composition. In one aspect of the present invention, the corrosion preventing agent comprises an inorganic material, preferably an inorganic salt. More preferably, the corrosion preventing agent is an inorganic phosphate salt. And most preferably, the corrosion preventing agent is monoammonium phosphate. Since ammonium ion itself has fungicide properties, use of monoammonium phosphate as the corrosion preventing agent is particularly useful where the surfactant (e.g., foaming agent) does not have a fungicide property. Preferably, the corrosion preventing agent comprises at least about 10% by weight of the main adhesion material.

The amount of main adhesion material present in the foamable binder composition of the present invention is, preferably from about 12% to about 48% by weight of the water. Preferably, the main adhesion material comprises polyvinyl alcohol.

The foamable binder composition of the present invention can also include a fast wet tack material, i.e., a special adhering component that is especially beneficial when the combination of binder composition and insulation particles are applied overhead or to a ceiling for preventing falloffs during drying of the foamed binder system. Any fast wet tack material known to one skill in the art may be used including vinyl acetate copolymers. When the fast wet tack material is present in the binder composition, it is generally present in the amount ranging from about 10% to about 25% by weight of the main adhesion material.

The amount of surfactant present in the foamable binder composition of the present invention is preferably at least about 2% by weight of the foamable binder composition, preferably about 2.3% by weight. Preferred surfactants are those which are capable of forming foams. Any surfactant which is capable of generating a foamable binder composition can be used. Such surfactants are well known to one of ordinary skill in the art. Preferably, the surfactant has a fungicide property to prevent growth of fungus. Exemplary surfactants which are capable of producing (i.e., inducing formation of) foam and have fungicide properties include lauryl sulfate.

Another embodiment of the present invention provides a method for producing the foamable binding composition described above. The method generally involves admixing in water a corrosion preventing agent, a main adhesion material, and a surfactant capable of inducing formation of foam. The method can also include admixing the fast wet tack material.

DETAILED DESCRIPTION OF THE INVENTION

The present invention relates to a binder composition, in particular foamable binder composition, having utility in a number of applications. In accordance with one application, the foamable binder composition is combined with insulation particles for use in installing insulation in a building, such as a house, to thermally insulate the building. A mixture of the foamable binder composition and insulation particles are herein referred to as a "foamable binder system."

In the present invention, a desirable component is included in the binder composition that is not previously found in the foamable binder composition of the prior art. Specifically, the binder composition of the present invention includes a corrosion preventing agent (to prevent possible corrosion of the building structure that receives and holds the foamable binder system) which, preferably, also has fire retardant properties.

In addition to the corrosion preventing agent, the binder composition of the present invention also includes a main adhesion material for achieving main adhesion properties. Any adhesive material capable of adhesion of the fibrous particles to each other and/or to a building structure can be used. Such adhesive materials are well known to one of ordinary skill in the art and include adhesive materials such as polyvinyl alcohol, polyvinyl acetate, ethylvinyl acetate, animal glue and the like. Preferably, the main adhesion material comprises polyvinyl alcohol.

The binder composition of the present invention can also include a special adhering component (e.g., a fast wet tack material) that is especially beneficial when the combination of binder composition and insulation particles, i.e., foamable binder system, is applied overhead or to a ceiling. The primary purpose of the fast wet tack material is to allow adhesion of insulating material to the building structure during a drying process, i.e., the fast wet tack material helps prevent falloffs during drying of the foamed binder system. In contrast, while the main adhesive material may also aid in preventing falloffs during a drying process, the primary purpose of the main adhesive material is to provide adhesion of insulation materials to the building structure after the foamable binder system has been applied to the building structure and dried.

The binder composition of the present invention also includes a surfactant which is capable of producing foams, i.e., foaming agent. A variety of surfactants which are capable of producing foamable binder composition are known to one of ordinary skill in the art. However, since the binder composition of the present invention is a water-based material, it is preferred that the surfactant be also capable of preventing growth of fungi, i.e., the preferred surfactants have fungicidal properties.

In a preferred embodiment, the binder composition of the present invention includes monoammonium phosphate (MAP) as the corrosion prevention and fire retardant component, polyvinyl alcohol (PVA) as the main adhesion component, vinyl acetate copolymer (VAC) as the special adhering component (i.e., a fast wet tack material), and sodium lauryl sulfate as the surfactant.

In one preferred binder composition formulation the following components by weight are identified as follows:

| | |
|---|---|
| warm water | 2075 lb. |
| monoammonium phosphate | 50 lb. |
| polyvinyl alcohol | 500 lb. |
| vinyl acetate capolymer | 80 lb. |
| sodium lauryl sulfate | 63 lb. |

The total weight of this one preferred mixture is 2,768 lbs. It has been found by the present inventor, that higher amount of MAP can also be used, for example, MAP in the range of from about 20% to about 40% by weight of PVA may be used. However, a higher amount of MAP lead to "gelling" of the binder composition within a relatively short period of time, thereby reducing its shelf-life. For example, a binder composition having about 20% of MAP by weight relative to PVA has shelf-life of about one week. In general, shelf-life of the binder composition is inversely proportional to the amount of MAP present in the binder composition. However, if the binder composition is to be used immediately, e.g., within few days, the binder composition may contain a relatively large amount of MAP, e.g., 20% to about 40% by weight of PVA. It should be appreciated that the higher amount of MAP in the binder composition also increases anti-corrosion and anti-flammable properties of the binder composition.

Alternatively, one can circumvent the short shelf-life problem of binder compositions containing high amount of MAP by adding MAP as needed just prior to using the binder composition. For example, a package of the corrosion preventing agent (e.g., MAP) and a binder composition containing all the necessary components of the present invention except for the corrosion preventing agent may be provided as a single unit, or they may be provided as separate units. This allows the user to add a desired amount of the corrosion preventing agent to the binder composition as needed prior to its use.

It is further noted that the binder composition formulation could be changed whereby the weight of the polyvinyl alcohol is increased up to 40%. The monoammonium phosphate, vinyl acetate copolymer, and sodium lauryl sulfate are then also increased proportionally to the polyvinyl alcohol. For example, the weight of the polyvinyl alcohol could be increased to 700 lb. (increase of 40% from the 500 lb.). In such a case, the corresponding weights for these other components would also be increased by 40%. Consequently, there is a greater concentration of such materials, in comparison with the water. Such a weight formulation is particularly applicable when shipping the binder composition so that there is relatively less water by weight and, after shipping, the binder composition could be diluted with water.

In connection with making this binder composition, a preferred order of combining is utilized. Heated water is provided having a temperature in the range of from about 110° F. to about 200 ° F. The monoammonium phosphate is first added to the water. This component conditions the water with the corrosion prevention and flame retardant properties. Next, the polyvinyl alcohol is added to the water whereby the concentration of the PVA is diluted, the vinyl acetate copolymer and then the sodium lauryl sulfate can be added. It is preferred that the sodium lauryl sulfate be added at least after the monoammonium phosphate and preferably after the polyvinyl alcohol. A desired combination of the components or mixing thereof may not be achieved if the sodium lauryl sulfate is added to the water before the monoammonium phosphate since the sodium lauryl sulfate can cause foaming, which can be a negative factor in later adding the monoammonium phosphate. It is also noted that when the MAP is added, it is done under agitation, with the heater on for heating the mixture, until the MAP is dissolved and when the PVA is included, it is thoroughly mixed so that it is substantially completely dissolved.

Related to the making or providing of the binder composition, one description of the amount of each component is based on its relationship to another component. In particular, the amount of PVA depends on the amount of warm water. In one preferred embodiment, as supported by the specific example described above, the amount of PVA is about 24% of the amount of water, the amount of MAP is about 10% of the amount of PVA, the amount of VAC is about 16% of the amount of PVA, while the amount of sodium lauryl sulfate is about 2.3% of the total weight of the binder composition.

The resulting mixture constitutes one preferred binder composition for combining with insulation particles for use in installing insulation material, as disclosed in U.S. Pat. No. 4,768,710. However, variations of the preferred weight percent of the total composition can be provided, based on for example, varying the amount of PVA that is utilized. The amount of PVA can be in the range of 50–750 lbs., while the other components of the above-noted formulation change based on the amount of PVA and the amount of water remains the same, or substantially the same. For example, the amount of warm water could be 2,075 lbs., the amount of PVA could be 50 lbs., while the VAC and MAP would be based on a percentage of the PVA, and the foaming agent (e.g., sodium lauryl sulfate) can be adjusted to be about 2.3% by weight.

In regard to use with insulation particles, the amount of PVA in the upper half of the range (closer to 750 lbs. than 50 lbs.) might be utilized in connection with installing insulation on a ceiling or upper structure to provide more adhesion, due to less water and relatively more, by weight %, of adhesive components (PVA, VAC). Less PVA, in the lower half of the range of PVA, may be acceptable for insulation that is applied to the walls or floors. Furthermore, the VAC may vary between 50–125 lbs., while the other component weights remain the same or essentially the same. When greater amounts of VAC are employed, the resulting mixture has decreased water solubility, which may be beneficial in an application where increased moisture or water is present, since this avoids possible unwanted dissolving of the material used with the binder system.

While the binder composition of the present invention can be used directly, when using the binder composition in combination with insulation particles to apply insulation to building structures, the above described binder composition is typically further diluted with water. Thus, prior to use the binder composition of the present invention is diluted, often on the job site, as follow: one part (by volume) of the binder composition is added to from about 2 parts to about 20 parts water, preferably from about 2 parts to about 15 parts water, and more preferably from about 10 parts to about 15 parts water.

In addition to use of the binder composition with insulation particles, as described in the '710 patent, other insulation related usages can be made thereof. In another application, it is known to apply an oil as an anti-dusting agent to insulation, as such is done during the manufacture of rockwool, ceramic fiber and fiberglass. During the manufacture of such insulation, the applied oil acts to control or reduce the amount of unwanted dust that is generated when such insulation is air blown during the manufacturing process. Instead of such oil, the binder composition of the present invention can be included with such insulation materials. While the insulation materials are air borne during the manufacturing process, water in the binder composition evaporates instantly so that they are sufficiently dry after this step of the process, while avoiding, or at least substantially reducing, the amount of dust generated.

The binder composition can also be utilized as a dust suppressant when the insulation particles are air borne during the process of blowing insulation into building cavities. In yet another embodiment, the binder composition of the present invention can be used in the manufacture of batt insulation. Presently, in manufacturing batts, the component phenyl formaldehyde is utilized. However, this may be hazardous, especially when wet, as an unwanted and potentially hazardous gas may be produced therefrom. The binder composition of the present invention can be substituted for this substance to achieve the same objectives or functions, while reducing the potential risk.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A foamable binder composition consisting essentially of:
   (a) a corrosion preventing and flame retardant agent consisting essentially of monoammonium phosphate;
   (b) a main adhesion material consisting essentially of polyvinyl alcohol;
   (c) a surfactant, wherein said surfactant is capable of inducing formation of foams; and
   (d) water, with said main adhesion material being in the range of about 12% to about 48% of the weight of said water.

2. The foamable binder composition of claim 1, wherein said corrosion preventing agent comprises at least about 10% by weight of said main adhesion material.

3. The foamable binder composition of claim 1 further comprising a fast wet tack material.

4. The foamable binder composition of claim 3, wherein said fast wet tack material comprises from about 10% to about 25% by weight of said main adhesion material.

5. The foamable binder composition of claim 1, wherein said surfactant comprises at least about 2% by weight of said composition.

6. The foamable binder composition of claim 1, wherein said surfactant has fungicide properties.

7. The foamable binder composition of claim 1, wherein said surfactant comprises lauryl sulfate.

8. A foamable binder composition comprising:
   (a) a corrosion preventing agent;
   (b) a main adhesion material;
   (c) a surfactant, wherein said surfactant is capable of inducing formation of foam;
   (d) water; and
   (e) a fast wet tack material comprising a vinyl acetate copolymer.

9. A foamable binder composition comprising:
   (a) water;
   (b) a main adhesion material in the amount of from about 12% to about 48% by weight of said water;
   (c) a corrosion preventing and flame retardant agent in the amount of about 10% to about 40% by weight of said main adhesion material; and
   (d) a foaming agent in the amount of at least about 2% by weight of said foamable binder composition.

10. The foamable binder composition of claim 9 further comprising a fast wet tack material in the amount of from about 10% to about 25% by weight of said main adhesion material.

11. A foamable binder composition comprising:
    (a) water;
    (b) a main adhesion material in the amount of from about 12% to about 48% by weight of said water;
    (c) a corrosion preventing agent in the amount of at least about 10% by weight of said main adhesion material;
    (d) a foaming agent in the amount of at least about 2% by weight of said foamable binder composition; and
    (e) vinyl acetate copolymer in the amount of from about 10% to about 25% by weight of said main adhesion material.

12. The foamable binder composition of claim 11, wherein said main adhesion material comprises polyvinyl alcohol.

13. The foamable binder composition of claim 12, wherein said corrosion preventing agent is monoammonium phosphate.

14. The foamable binder composition of claim 13, wherein said foaming agent comprises lauryl sulfate.

15. A method for providing a foamable binding composition comprising admixing in water having a temperature of at least about 110° F. and while said water is being heated and a corrosion preventing and flame retardant agent, a main adhesion material, and a surfactant capable of inducing formation of foams; and diluting subsequently said binding composition by combining one part thereof to about two parts to about twenty parts water;

wherein the amount of said corrosion preventing and flame retardant agent is at least about 10% by weight of said main adhesion material, with said amount depending on a shelf-life of said binder composition.

16. The method of claim 15, wherein the amount of main adhesion material is from about 12% to about 48% by weight of the water.

17. The method of claim 16 further comprising admixing a fast wet tack material.

18. The method of claim 17, wherein the amount of fast wet tack material is from about 10% to about 25% by weight of the main adhesion material.

19. The method of claim 18, wherein the amount of the surfactant is at least about 2% by weight of the total weight of the foaming binding composition.

20. The method of claim 15, wherein said corrosion preventing agent is mixed with said water before including said surfactant.

21. The method of claim 20, wherein said main adhesion material is mixed with said water after said corrosion preventing agent and before said surfactant is included.

* * * * *